United States Patent [19]

Rankin et al.

[11] Patent Number: 4,883,701

[45] Date of Patent: Nov. 28, 1989

[54] INFANT CAR SEAT LINER

[75] Inventors: Janice J. Rankin; Marilyn M. Pearson, both of Portland, Oreg.

[73] Assignee: Weyerhaeuser Company, Tacoma, Wash.

[21] Appl. No.: 187,988

[22] Filed: Apr. 29, 1988

[51] Int. Cl.⁴ .............................................. B32B 3/10
[52] U.S. Cl. .................... 428/136; 428/137; 428/210; 428/282; 428/284; 428/285; 428/286; 428/297; 428/298; 428/326; 428/172; 428/903; 428/913; 428/192; 297/219; 297/229; 297/DIG. 5; 5/483; 5/484; 5/487; 104/367; 104/378; 104/385.1; 104/393
[58] Field of Search .............. 428/280, 137, 282, 138, 428/284, 218, 285, 136, 286, 288, 297, 298, 903, 192, 326, 920, 913, 156, 171, 172; 297/219, 229, DIG. 5; 5/483, 484, 487; 604/385.1, 379, 367, 378, 381, 393

[56] References Cited

U.S. PATENT DOCUMENTS

| | | | |
|---|---|---|---|
| 257,084 | 9/1980 | Fuller et al. | D6/48 |
| 257,086 | 9/1980 | Fuller et al. | D6/48 |
| 266,802 | 11/1982 | Gooding | D6/5 |
| 283,475 | 4/1986 | Reece | D6/611 |
| 2157,085 | 9/1980 | Fuller et al. | D6/48 |
| 2,652,183 | 9/1953 | Hlivka | 297/229 |
| 3,065,751 | 11/1962 | Gobbo, Sr. et al. | 5/487 |
| 3,315,676 | 4/1967 | Cooper | 5/487 |
| 3,477,433 | 11/1969 | Dillon | 128/290 |
| 3,591,875 | 7/1971 | Zipf, III | 5/487 |
| 3,654,059 | 4/1972 | Zisblatt | |
| 3,767,452 | 10/1973 | Lauchenauer | 297/DIG. 5 |
| 3,934,285 | 1/1976 | May | 297/DIG. 5 |
| 4,188,065 | 2/1980 | Meeker | 297/485 |
| 4,213,459 | 7/1980 | Sigl et al. | 604/380 |
| 4,443,512 | 4/1984 | Delvaux | 604/379 |
| 4,478,453 | 10/1984 | Schutz | 297/219 |
| 4,525,409 | 6/1985 | Elesh | 5/483 |
| 4,621,004 | 11/1986 | Madsen | 428/80 |
| 4,751,134 | 6/1988 | Chenoueth et al. | 428/285 |
| 4,752,349 | 6/1988 | Gebel | 156/267 |
| 4,769,023 | 9/1988 | Goebel et al. | 604/385 R |

FOREIGN PATENT DOCUMENTS

| | | | |
|---|---|---|---|
| 0202472 | 11/1986 | European Pat. Off. | 604/367 |
| 2516373 | 10/1975 | Fed. Rep. of Germany | 604/379 |

OTHER PUBLICATIONS

Copyright Registration VAU 98,854 for Universal Disposable Children's Car Seat Insert, issued Jul. 17, 1986.
Rankin Enterprises Children's Car Seat Cover Patterns 1001, 2002, 3003, 4004, 5005, 6006 and 7007.
Naci Industries brochure showing prior art Car Seat/Cradle Covers Models 801, 802, 811, 813, 831, 851, 852, 853, 861, 875, 215, 111, 152 and 142.
Baby Dreams Promotional Materials Showing a Prior Art Infant Car Seat Cover.
Sketch of Prior Art Cloth Infant Seat Liner.
Sketch of Prior Art Nanci Industries "Safe & Sound" Cloth Infant Seat Cover.
Sketch of Diplomat Corp. Style 29-3 Cloth Infant Seat Cover.
Sketch of "Tailored Babyform" Cloth Infant Seat Cover from Tailored Baby, Inc.
Sheets of Measurements of Prior Art Infant Car Seat/Carrier Dimensions.
The following prior art Infant Car Seats and Cover, shown in Exhibit H: Cosco/Peterson Safe-T-Seat; Cosco/Peterson Safe & Snug; Cosco/Peterson Cosco Commuter; Strollee Wee Care 610; Strolee 612; Fisher-Price Carseat; Strolee Wee Care 618; Century 400 XL; Fisher-Price Infant Seat; Questor Kwantet One-Step; Century 2000 STE; Evenflo Maxi-Mite; Cosco Day Cradle; Century 580 Infant Seat; Dyno-O-Mite by Evenflo; Kolcraft Rock n' Ride; Kolcraft Carri-Cradle; Century Kanga-Rock-A-Roo; Cosco/Peterson First Ride; Century Infant Love Seat; Collier/Keyworth CK Classis; Cosco Commuter; and Gerry Guardian.

Primary Examiner—Ellis P. Robinson
Assistant Examiner—P. J. Ryan
Attorney, Agent, or Firm—Klarquist, Sparkman, Campbell, Leigh & Whinston

[57] ABSTRACT

A disposable infant seat liner is described with shoulder strap receiving slotways and leg or crotch strap receiving slotways designed to fit infant seat liners having various strap placements. Infant carrier handle or strap receiving slotways may also be included, and may be of an arcuate shape, for receiving infant carrier handles or waist straps. The strap receiving slotways may be selectively opened by a user and may also be perforated to facilitate this selective opening.

26 Claims, 3 Drawing Sheets

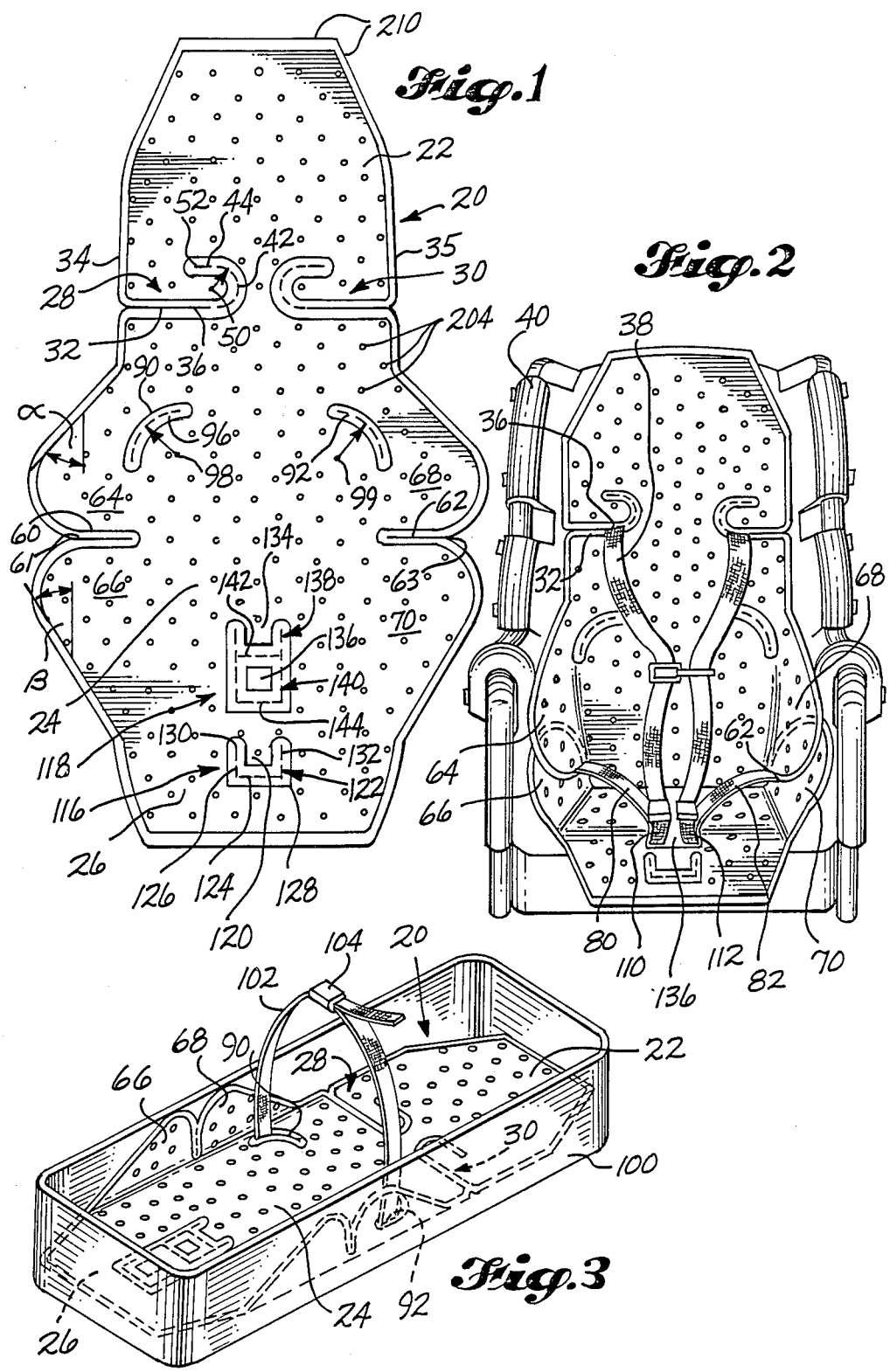

INFANT CAR SEAT LINER

BACKGROUND OF THE INVENTION

The present invention relates to liners for infant car seats and more specifically to limited life or disposable liners for use with infant car seats of a variety of different sizes and shapes.

Infant car seats are required in many states and are used by many parents. These seats are designed to protect the infant by reducing the possibility of injury in the event of a traffic accident. The infant car seats are provided with a structure which enables the infant seat to be affixed to the seat of a vehicle. Straps, which can be fastened around the infant, are provided to retain the infant in the infant seat.

Infant seats are subject to spills of food, beverages and to otherwise being soiled. The infant seats can be difficult to clean and keep sanitary. Also, infant seat straps typically pass through slots in the seat which are particularly difficult to clean.

The seats are commonly of a cloth material which is difficult to clean or of plastic or vinyl which is somewhat easier to clean. However, plastic or vinyl infant seats tend to be uncomfortable, particularly to the sensitive skin of an infant. When exposed to direct sunlight in the summer, such materials tend to become extremely hot and sticky. In the winter, plastic and vinyl materials become uncomfortably cold. Moreover, plastic and vinyl infant seats are not soft to the touch and typically cannot be removed for washing.

It has been proposed to use liners for infant car seats. A typical liner is of a multi-piece cloth construction with a pocket for receiving the upper end of an infant car seat. Cloth liners of this type are often held in place by ties and include strap receiving slots through which the infant seat straps are threaded or positioned when the liners are in place.

Although cloth liners can be removed and washed, this requires some effort, particularly when straps need to be threaded through slots in the liners for removal and replacement. Consequently, there is a tendency for users to leave the liners in place even when somewhat soiled. In addition, unless an individual has a spare cloth liner, the infant seat is used without a liner until the washing is complete. Known cloth liners are frequently sewn so that they are relatively time consuming and labor intensive to produce. Fuller et al. U.S. Design Pat. Nos. 257,084, 257,085, and 257,086; Schutz U.S. Pat. No. 4,478,453; Reece U.S. Design Pat. No. 283,475; and U.S. Pat. No. 4,188,065 of Meeker are examples of this type of liner.

In addition, U.S. Design Pat. No. 266,802 of Gooding (FIG. 4 of the Gooding patent) appears to show a plastic or vinyl infant car seat liner of stacked or laminated components which provide raised cushioning sections. The Gooding design would suffer from many of the drawbacks mentioned above in connection with plastic or vinyl infant seats.

U.S. Pat. No. 4,621,004 of Madsen describes a disposable car seat liner as including a disposable diaper type liquid absorbent material, such as cotton batting, on a water repellant backing material, such as vinyl, and a permeable facing which holds the absorbent material in place on the backing. Paper facing or a cotton polyester blend fabric material is described as being a suitable facing. In Madsen, a pair of L-shaped sides are described as being adapted for attachment to a body, for example, by stitching or sewing. The upper shoulder straps of the infant seat shown in Madsen pass above the level of the liner. Thus, the Madsen design illustrates a multi-piece liner that would not provide any protection for an infant's neck and head.

Therefore, a need exists for an improved limited life or disposable infant seat liner for infant car seats and more particularly for infant seat liners of the type having a pair of shoulder straps and at least one leg strap, the improved infant seat liner being directed towards overcoming these and other disadvantages of the prior art.

SUMMARY OF THE INVENTION

The inventors were assigned the task and have achieved a design for a universal infant car seat liner which fits substantially any commercially available infant car seat sold for newborn infants to those sold for toddlers of about forty pounds. Such an infant seat liner must accommodate the various placements of shoulder, waist and crotch or leg straps, as well as the various infant seat shapes, that are found in today's infant car seat designs.

In accordance with the present invention, an infant seat liner is provided with plural strap receiving slits or slotways. These slits or slotways are designed and positioned to permit placement of the infant seat liner in the infant seat with such slits or slotways aligned with both the upper shoulder straps and lower crotch or leg straps of any of a wide variety of infant car seats. It is highly desirable that one size of infant seat liner fit as many commercially available infant seats as possible. This makes it easy for a consumer to purchase such liners without the worry of having the wrong size or wrong style of liner for the user's particular brand of infant car seat.

As another objective of the invention, an infant seat liner of the present invention is efficient and inexpensive to manufacture so that it can be replaced when it becomes soiled. In this regard, the infant seat liner is easy to replace so that it may quickly be replaced at any time, and under virtually any conditions. In one preferred embodiment, instruments, such as scissors, and difficult maneuvers, such as threading straps through strap slots are avoided during replacement.

As another object of the invention, the infant seat liner is absorbent so as to retain any spills that might occur. In addition, the infant seat liner of the present invention does not transmit such spills to the difficult to clean infant car seat itself.

Another object of the present invention is to provide an infant seat liner which is stiff enough to be placed in an infant seat and hold its shape, but is still able to conform to the shape of the seat. An optional fastening system may be used to secure the liner in position.

Although a disposable infant seat liner is desired, the liner of the present invention is also durable so that it maintains its integrity during use. For the safety of infants, the infant seat liner is not easily pulled apart.

Another object of the present invention is to provide an infant seat liner which does not significantly retain heat and which provides insulation from both hot and cold infant seats.

A still further object of the present invention is to provide an infant seat liner which provides protection of an infant's head, neck and shoulders as well as the infant's back, seat and legs. The liner simultaneously protects the infant car seat from soiling and wearing out.

A further object of the present invention is to provide an attractive, soft, and comfortable infant seat liner.

The inventors were able to provide a preferred embodiment of an infant car seat liner that substantially meets these diverse objectives, particularly for smaller infant car seats, together with other designs. It took many tries and a number of changes before these objectives could be met. Minor modifications to this infant seat liner became of great importance.

The preferred embodiments of the present invention have a number of features which individually and collectively allow these designs to function as extremely versatile infant car seat liners for a wide variety of infant car seat styles and sizes.

In accordance with the invention, a first form of infant seat liner has a unitary body of sheet material with an upper shoulder supporting section, a central section and a lower leg supporting section. The central section is enlarged relative to a lower end portion of the lower leg supporting section. Inwardly directed slits extend from the side edges of the central body section. These slits permit portions of the central section adjacent the slits to overlap one another when the body is positioned in an infant seat.

In this embodiment, at least one shoulder strap receiving slotway is positioned at each side of the center line of the upper shoulder supporting section. To accommodate a variety of shoulder strap placements, plural, in this case two, shoulder strap receiving positions are defined by each slotway. These slotways may be perforated for selective opening as described below. Each slotway may take the form of an outwardly facing U-shaped slotway with one leg extending to a respective side edge of the body. Therefore, in this embodiment of a liner, the shoulder straps may be inserted from the periphery of the body without the need to be threaded through slits, as is the case with many forms of cloth or plastic liners.

First and second transversely spaced waist or chest strap receiving slotways, which may also be perforated as described below for selective opening, are each positioned between a respective side slit and a respective shoulder strap receiving pathway. These waist strap receiving slotways may be arcuate to accommodate a variety of positioned waist straps of infant seat type carriers.

The lower section of this form of infant seat liner has plural, in this case three, crotch or leg strap receiving flaps, covered slots or openings which may be defined by cuts or perforations. These perforations or cuts can be of an upwardly facing U-shape. The use of plural lower strap receiving slots in combination with at least two shoulder strap positions facilitates the use of such a liner with a variety of styles of commercially available infant seats.

In other embodiments of the invention, plural shoulder strap receiving slots or positions may be provided, with each such position being accessible from the adjacent side edge of the infant seat liner. The slots may be defined by upwardly facing U-shaped cuts or perforations. These perforations, and thus the slots, may communicate with the adjacent side edge of the liner by way of a single common slit or pathway. Alternately, each of the slotways may communicate with the adjacent side edge of the liner by way of a distinct pathway.

The shoulder strap receiving slotways and other slits, pathways and slots, may be closed until selectively opened by a user to permit the positioning of the shoulder straps of the infant seat at desired positions. In particular, although instructions for severing the liner or indicia may be provided on the liner to guide the user in selectively severing the liner, preferably the slotways, slits, slots and pathways are defined by weakened areas which enhance the manual frangibility of the liner to selectively open the liner without requiring any tools. These weakened areas may comprise score lines, but more preferably comprise perforations.

An optional fastening system, such as employing adhesive tape or hook and loop fabric may be provided for releasably securing the infant seat liner to the infant car seat.

These and other objects, features and advantages of the present invention will become apparent with reference to the following description and drawings.

BRIEF DESCRIPTION OF THE DRAWINGS

FIG. 1 is a font elevational view of an infant seat liner in accordance with the present invention;

FIG. 2 is a front perspective view of the infant seat liner of FIG. 1 in position on an infant car seat;

FIG. 3 is an isometric view of the infant seat liner of FIG. 1 in position on an infant seat of the carrier type without shoulder straps;

DETAILED DESCRIPTION OF THE PREFERRED EMBODIMENT

Figure 4:
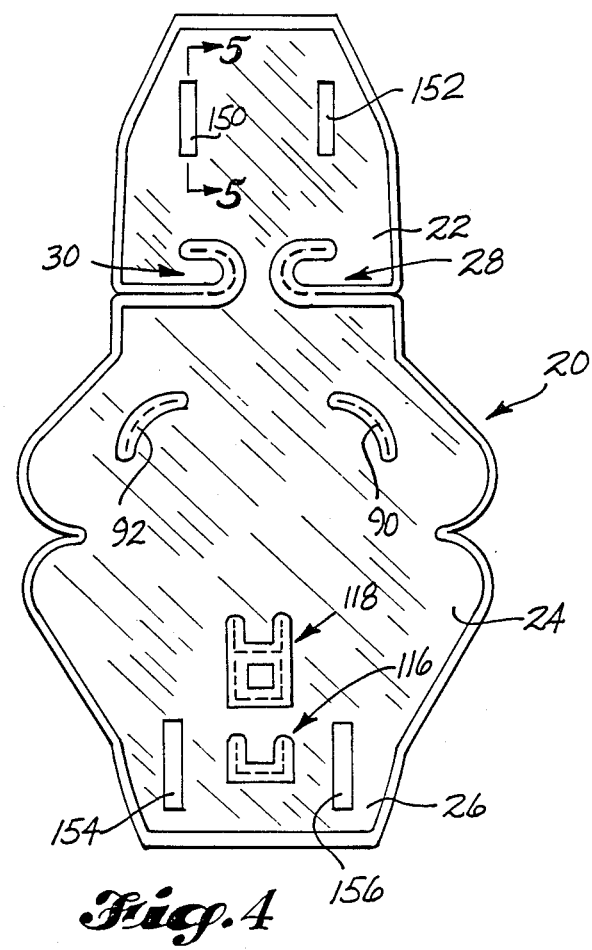
FIG. 4 is a rear or back elevational view of the infant seat liner of FIG. 1.

For convenience, in the present description all lengths or distance dimensions are measured from the bottom edge of the infant seat liner, unless otherwise indicated.

The infant seat liner 20 of FIG. 1 is comprised of a unitary body having an upper shoulder supporting section 22, a central or middle section 24 and a lower leg supporting section 26. Although variable, the total length of the article is about twenty-eight and one-half inches for infant car seats and carriers for infants of up to twenty pounds, and is typically larger (i.e. about thirty-three inches) if it is also to be used for larger sized infant car seats. The thickness of the body is typically about three-eighths of an inch in uncompressed areas.

The upper section of the body is generally rectangular in shape although the side edges of this section taper inwardly near the top. Upper section 22 is longer than wide and has a straight upper edge. Although variable, the width of the upper body section typically ranges from a minimum of about eleven and one-half inches to a maximum of about fifteen inches, with twelve and one-half inches being optimum.

Shoulder strap receiving slotways 28, 30 are provided at each side of the center line of the upper shoulder supporting section 22. Since the slotways 28 and 30 are mirror images of one another, only the slotway 28 will be described. The illustrated slotway 28 is of a generally outwardly turned U-shaped configuration. This slotway includes a first path section 32 extending from a side edge 34 of the upper body section in a direction generally perpendicular to the longitudinal center line of the infant seat liner 20. A portion 36 of pathway 32 comprises a first shoulder strap receiving position or slot within which a shoulder strap, such as shoulder strap 38 of the infant seat liner 40 (FIG. 2), may be positioned. The slotway 28 curves upwardly from location 36 along a path section 42 and then extends outwardly along a section 44 toward the side edge 34, but terminates short of the side edge. The slotway section 44 provides another shoulder strap receiving position or slot to accommodate infant car seats having different shoulder strap placements than shown in FIG. 2.

With the illustrated construction, each of the slot sections 36 and 44 are accessible from the periphery, in this case the side edge 34 of the infant seat liner. Therefore, the shoulder straps of an infant car seat may be slid into position within slots 36 or 44 along path section 32 without the need to thread these straps through slits. The slotway 30 is similarly accessible from the other side edge 35 of the infant seat liner.

As in the case of other openings described below, the slotways 28 and 30 may be formed by cutting the infant seat liner prior to sales to the ultimate user, may be defined by indicia on the liner, which may be cut by the user, or may be defined by instructions which direct the user to cut the slits as required. However, in the preferred design, the slotways 28 and 30 are selectively openable at least in part by a user. More specifically, weakened areas are provided in the liner to enhance the manual frangibility of the liner along the pathways in comparison to the unweakened areas. Although weakened areas such as score lines may be used, perforations positioned along the desired path sections or slotways are preferred. The perforated shoulder strap receiving pathways or slotways 28, 30 are thus retained in a closed position, so as to preserve the integrity of the body, until the perforations are torn by a user. When severed in this manner, the shoulder strap receiving pathways are opened a selective amount for positioning of the shoulder straps therein. Any unsevered portions of the slotways 28, 30 aid in reinforcing the body of the liner. However, since path section 36 is frequently used for convenience, it may simply be cut, with the remainder of the pathway being perforated.

The slotways 28 and 30 thus divide the upper section 22 from the central section 24. Typically, the section 42 of slotway 28 is generally semicircular in shape, and has a center 50 and a radius of curvature of three-fourths of an inch. The point 50 is positioned between the shoulder strap receiving slotway sections 36 and 44. These latter sections are approximately one and one-half inches apart. The end 52 of section 44 is spaced slightly more than two and one-half inches from the center line of the infant seat liner 20. A substantial unbroken section of the body remains between end 52 and the side edge 34. This helps to minimize the weakening effect of the slot section 44 on the remaining portions of the body. The distance from the lower edge of the infant seat liner to the point 50 is approximately twenty inches. These dimensions may be varied, but optimize the fit of the infant seat liner to a wide variety of smaller sized infant car seats and infant carriers.

By providing a shoulder strap receiving slotway having sections 36, 42 and 44, the infant seat liner 20 can be moved upwardly or downwardly in the infant seat until one of these sections is aligned with the shoulder straps and a lower crotch or leg strap receiving aperture, described below, is aligned with infant car seat crotch straps.

As best seen in FIG. 1, the central section 24 of the infant seat liner 20 is enlarged in width relative to the upper section 22 and to a lower end portion of the leg supporting section 26. The liner 20 includes a first slit or cut 60 extending inwardly from a point 61 at the side edge 34 of liner 20 and a second cut or slit 62 extending inwardly from a point 63 at the side edge 35 of the liner. As described above, the slits or cuts 60, 62 may be selectively openable, for example, with perforations provided for this purpose. The slit 60 separates an upper side portion 64 of central section 24 from a lower side portion 66 of the central section. Similarly, the slit 62 separates respective upper and lower side portions 68, 70 of the central section 24. The sections 64, 66, 68 and 70 in effect comprise lobes of the central section 24 of the infant seat liner. The boundaries of the side sections 64, 68 adjacent the respective points 61 and 63 are generally semicircular with a radius of curvature of approximately one and seven-eighths inches. From the upper end of these curved regions, the boundary of side section 64 extends upwardly along a line at an angle alpha (FIG. 1) of approximately forty-four degrees with respect to a line parallel to the longitudinal center line of the infant seat liner. Side section 64 is similarly shaped at its boundary. The boundaries of the side sections 66, 70 adjacent the respective points 61 and 63 are also generally semicircular, with a radius of curvature of approximately two inches. In addition, the boundary of the side section 66 extends downwardly from the adjacent curved boundary section along a line at an angle beta (FIG. 1) of approximately thirty-one degrees with respect to a line parallel to the longitudinal center line of the infant seat liner. Side section 70 has a similar shape at its boundary. The slits 60 and 62 are in a line generally perpendicular to the longitudinal center line of the infant seat liner and are spaced approximately ten and one-fourth inches from the bottom edge of the infant seat liner.

When placed in an infant car seat, as shown in FIG. 2, the side portion 64 overlaps the side portion 66 while the side portion 68 overlaps the side portion 70. This holds the side portions in place against the sides of the infant car seat. The inner section of cut 60 accommodates a leg or waist strap 80 (FIG. 2), while the cut 62 receives a leg or waist strap 82. If the infant seat liner does not have these waist straps, then the cuts 60 and 62 need not be as deep. Also, when cuts 60 and 62 are perforated, the depth of the cuts is adjusted by selectively opening the perforations only to the extent needed to accommodate these straps. Also, the cuts 60 and 62, in one form of a liner, can be relatively shallow with a perforated extension. The extension is then selectively opened when used with infant car seats having waist straps.

The infant seat liner includes first and second waist strap receiving slotways 90, 92. Each of these slotways are spaced transversely from one another and from the longitudinal center line of the infant seat liner. In addition, the slotway 90 is positioned between the shoulder strap receiving slotway 28 and the slit 60 while the slotway 92 is positioned between shoulder strap receiving slotway 30 and the slit 62. The slotways 90, 92 may comprise cuts or slits, or they may be perforated or otherwise weakened or marked for selective opening by a user. As in the case of the other perforations of liner 20, the perforations forming slotway 90 may be formed in a densified, compressed and bonded area 96 of the infant seat liner as explained in greater detail below. The slotways 90, 92 are typically of arcuate shape and may comprise arcs of a circle having respective centers at 98, 99. A typical radius of curvature of the slotways 90, 92 is about one and one-half inches. In addition, the centers 98, 99 are typically offset about two and one-half inches from the longitudinal center line of the infant seat liner and about thirteen and one-half inches from the bottom edge of the liner.

As shown in FIG. 3, when the infant seat liner 20 is placed in an infant carrier 100, the position of the liner may be shifted until waist straps 102 of the carrier are aligned with the slotways 90 and 92. The waist straps are then inserted through the respective slotways 90, 92 and, for example, are buckled at 104. The angled positioning of the slotways 90, 92 relative to the longitudinal center line of the infant seat liner, and in particular their arcuate shape, enable the slotways to readily accommodate various infant carrier strap and handle placements.

Infant car seats, such as shown in FIG. 2, may have a single lower leg or crotch strap or double lower leg straps 110, 112 as shown in this Figure. These straps may be placed on the front of the infant car seat as shown in FIG. 2, or within the car seat. In the FIG. 1 form of the invention, plural potential apertures or slotways 116, 118 are provided to accommodate the various styles and positions of crotch straps that are found in various infant car seats. The illustrated lower slotway 116 includes a first flap 120 defined by an upwardly facing U-shaped cut, weakened area, marked area or perforation 122 formed in the lower section 26. The perforation 122 defines a lower flap edge 124 and side flap edges 126, 128. The side edges have respective upper ends 130, 132. The lower edge 124 is perpendicular to the longitudinal center line of the infant seat liner while the side edges 126, 128 are parallel to the longitudinal center line. The distance from the lower edge of the infant seat liner to the edge 124 is approximately two and one-half inches, while the edges 130, 132 are typically about one inch long. The lower leg strap receiving slotway 116 may be selectively opened by a user, as by severing perforations, to receive leg or crotch straps of an infant seat liner. The use of flaps such as flap 120 allows the liner to shift longitudinally to accommodate different crotch strap placements while the upper shoulder strap slotways 28, 30 are aligned with respective upper straps of the infant car seat.

The leg strap receiving slotway 118 is positioned above the slotway 116. The illustrated form of upper slotway 118 comprises a pair of flaps 134, 136 defined by respective upwardly opening U-shaped cuts, weakened areas, marked areas or perforations 138, 140. The perforation 138 has a lower edge 142 together with a pair of side edges. The perforation 140 is of similar construction with a lower edge 144 and a pair of side edges. The edge 144 is typically about five inches from the lower edge of the infant seat liner while the edge 142 is about six and one-half inches from this lower edge.

Again, like the flap 120, the flaps 134 and 136 may be selectively opened as required to accommodate leg straps of an infant car seat. In FIG. 2, the flap 136 is opened to receive the leg straps 110 and 112. The use of flaps provide access for infant seats which have a connector below the seat level.

In addition, the distance from the top crotch strap slot edge 142 along the longitudinal center line of the pad to the first shoulder strap slot section 36 is about twelve and one-fourth inches, and to the second shoulder strap slot section 44 is about thirteen and three-fourths inches. Also, the distance along the longitudinal center line of the infant seat liner from the edge 144 of the middle leg strap receiving slot to shoulder strap section 36 is about thirteen and three-fourths inches, and to the shoulder strap receiving section 44 is about fifteen and one-fourth inches. In addition, the distance along the center line of the infant seat liner from the lower leg strap slot edge 124 to the shoulder strap slot section 36 is about sixteen and three-eighths inches, and to the shoulder strap slot section 44 is about seventeen and seven-eighths inches.

Although these dimensions may be varied, they optimize the fit of the infant seat liner to a wide variety of infant seats, particularly those designed for smaller sized infants. That is, the various leg strap receiving positions and shoulder strap receiving positions enable the liner to be adjusted upwardly or downwardly in an infant seat to achieve the best alignment with the shoulder straps and leg straps of the infant car seat.

Figure 5:
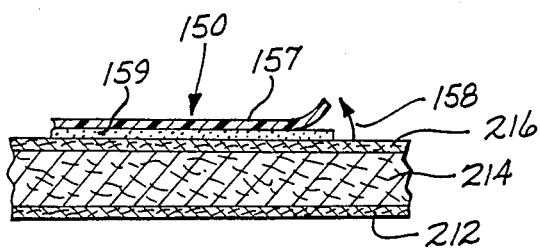
FIG. 5 is a sectional view of a portion of the infant seat liner of FIG. 4, taken along lines 5—5 thereof, and showing a section of one form of the optional fastening system used to releasably secure the infant seat liner to the infant seat or carrier.

The infant seat liner 20 may be releasably secured to the infant seat. As shown in FIG. 5, an adhesive type fastening system such as comprised of plural adhesive tapes may be used to accomplish this fastening. These tapes utilize an adhesive which sticks to materials normally used for infant seats. These materials include vinyls, cloths and high impact plastics. The liner should also be easily removable without leaving an adhesive residue or film, and without causing the seat material to deform. Typical adhesive tapes that meet these requirements include commercially available product 401 and 404 adhesive tapes from the 3M Company of St. Paul, Minn. Of course, adhesive applied directly to the infant seat liner and covered by a removable cover strip is also suitable. Also, hook and loop fabric fastening systems may be used.

With reference to FIG. 4, the illustrated taping system includes a pair of upper tape strips 150, 152 and a pair of lower tape strips 154, 156. As shown in FIG. 5, and with reference to tape strip 150, these strips include a peelable cover layer 157 which is removed, as indicated by arrow 158, to expose an adhesive layer on a substrate 159. The substrate 159 is adhesively secured to the liner and the adhesive exposed when layer 157 is removed adheres to the infant car seat when the infant seat liner is in position.

The tapes 150–156 are applied longitudinally with the pad and extend from a position adjacent the edge of the pad toward the center of the pad. The strips are typically each one inch by four inches and positioned with about two and three-fourths inches from the longitudinal center line of the pad to the center line of each strip.

Figures 6, 7:
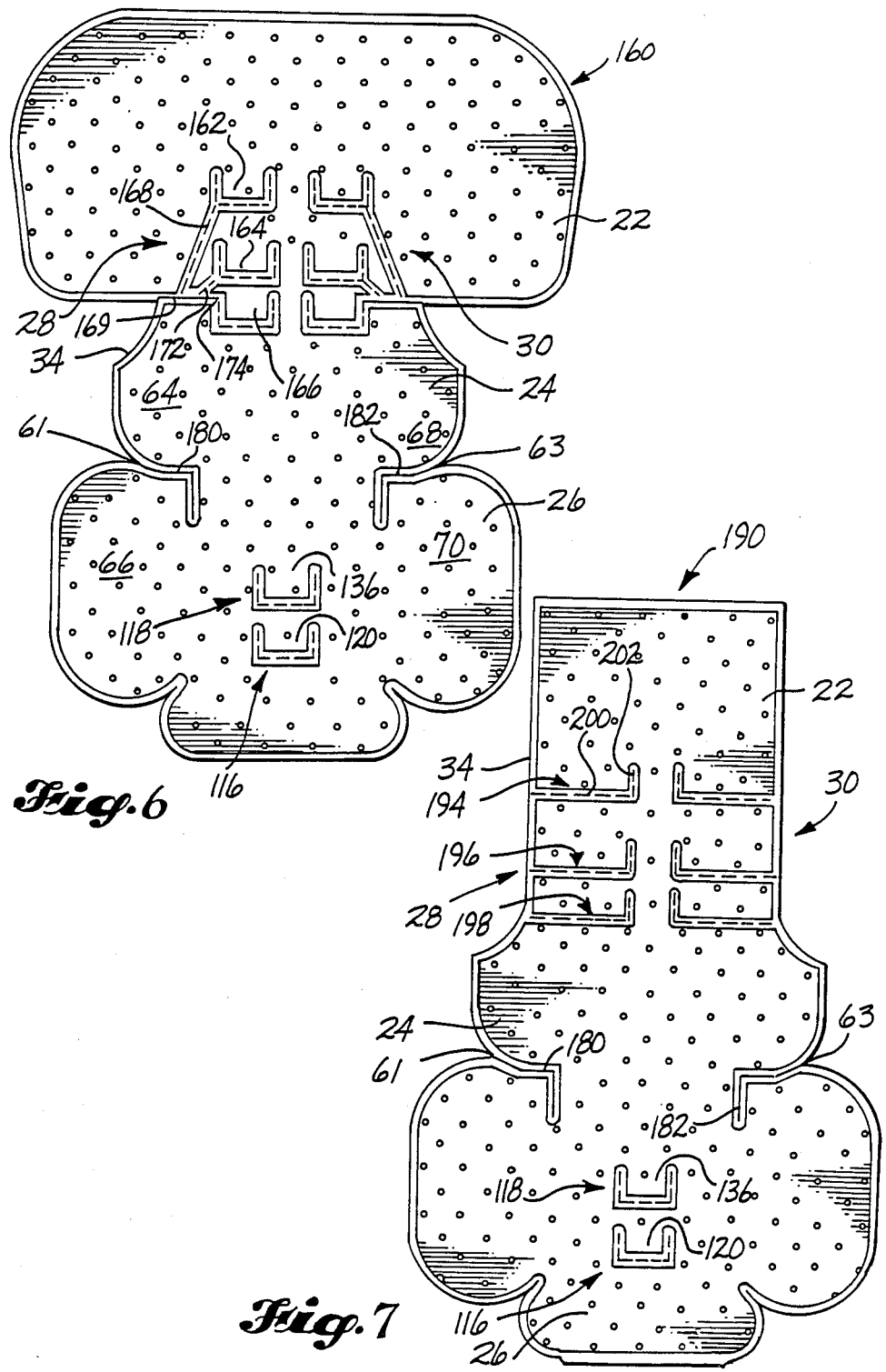
FIG. 6 illustrates another form of infant seat liner of the invention.
FIG. 7 illustrates a further form of infant seat liner in accordance with the present invention.

Other embodiments of infant seat liners in accordance with the present invention are illustrated in FIGS. 6 and 7. Elements of the infant seat liners of these figures corresponding to elements of infant seat liner 20 in FIG. 1 are identified with corresponding numbers and will not be discussed in detail.

In general, the infant seat liner 160 of FIG. 6 has an upper section 22 which is of a generally rectangular shape with rounded corners. The upper section has a width which is greater than its height. In addition, the upper shoulder strap receiving slotways 28, 30, described in connection with slotway 28, includes three flaps 162, 164 and 166 which are defined by cuts or perforations. The perforation or cut which defines the flap 162 is joined by perforations or a cut along a path 168 to a slit or perforation 169 which extends transversely inwardly from the side edge 34 of the infant seat liner. Similarly, the perforation or cut defining the flap 164 is joined by perforations or a cut along a path 172 to the slit 169. Also, the perforation or cut which defines the flap 166 is joined along a path 174 to the slit 169. Thus, each of the slotway defining shoulder strap receiving flaps is accessible from a common access point, by way of slit or perforations 169, from the side edge of the infant seat liner. Again, when perforations are employed, the user may selectively open only the shoulder strap receiving path 168, 172 and 171 and associated flap 162, 164 and 166 needed to receive a shoulder strap of the user's infant car seat.

In addition, the waist strap receiving cuts or perforations 180, 182 of liner 160 extend inwardly from the respective points 61, 63 and then downwardly. This allows the infant seat liner to be shifted upwardly or downwardly even though waist straps may be positioned in cuts 180, 182. This adjustment facilitates the positioning of one pair of shoulder strap receiving flaps in alignment with shoulder strap slots or flaps of the infant sear liner and a leg strap receiving flap 120 of a slotway 116 in alignment with leg straps of the infant seat.

The FIG. 6 form of the invention is somewhat bulkier than the FIG. 1 form. Also, due to the fact that the FIG. 6 form of liner only has two leg strap receiving slotways 116, 118 it is somewhat less versatile that the FIG. 1 design. Nevertheless, the FIG. 6 form of the invention still fits a number of different styles of infant car seats.

In the infant seat liner 190 of FIG. 7, the upper body section 22 is rectangular and of a narrower transverse cross sectional dimension than the middle body section 24. Also, the shoulder strap receiving slotways 28, 30 assume a different form from those shown in FIGS. 1 and 6. More specifically, as described with respect to slotway 28, plural shoulder strap receiving slits 194, 196 and 198 are provided in the upper section 22. These slits each include a first leg section (i.e. 200 for slotway 194) extending inwardly from the side edge 34 of the infant seat liner and a second leg section (i.e. 202 for slotway 194) extending upwardly from the inner end of the first leg section. The first leg section extends in a direction generally perpendicular to the longitudinal center line of the infant seat liner, while the second leg section is generally parallel to the longitudinal center line. The slotways 194, 196 and 198 may be selectively openable by a user to accommodate the shoulder straps of the user's infant seat.

The FIG. 7 form of infant seat liner also fits a wide variety of infant seats. However, it has been found that, if the slotways 194, 196 and 198 comprise cuts, then the upper section 22 of the liner tends to lack the desired stiffness and tends to be weak. Also, if these slotways are perforated or otherwise selectively openable by a user, and assuming a user makes a mistake and opens more slotways than necessary, this drawback is still present. Therefore, although possessing a number of advantages, the FIG. 7 form of the invention is less advantageous than the FIG. 1 form of the invention.

The liners of the present invention are symmetrical about their longitudinal center line. Also, the rounded corners and curved edges of the FIG. 1 form of liner give it a smooth and soft appearance.

As previously noted, it is desirable for infant car seat liners to have other attributes. For example, such liners should be absorbent to hold spills that may occur. In addition, the liners should not transmit the spills to the car seat itself, but instead should retain the spills within the liner. Also, the liner should provide insulation against hot and cold temperatures and should not retain heat. Moreover, the infant seat liner should be stiff enough to be placed in the seat and hold its shape, but still be able to conform to the shape of the seat. In addition, the infant seat liner should be sufficiently durable to maintain its integrity during use and should not be pulled apart easily. Also, infant seat liners of the disposable type should be relatively inexpensive and cost effective to manufacture so that they can be discarded when they become soiled.

In accordance with the present invention, integrity is maintained in part by the use of selectively openable perforated or weakened sections. Only those perforations necessary to accommodate straps of a particular user's infant car seat are opened during use of the liner. The remaining perforations assist in holding the liner together. Integrity is also enhanced by bonding layers of the infant seat liner together during formation as indicated by discrete compressed and thermobonded or embossed areas 204 in FIG. 1. In addition, the entire periphery of the infant seat liner is typically bonded as shown in part at 210 in FIG. 1. Also, slotways and other areas of the infant seat liner in which perforations are formed are typically bonded, as indicated by the bonded area 96 in FIG. 1. Although the need for these bonds varies with the type of material being used, when a liner is formed of a material such as explained below, these bonds are typically formed by an application of heat and pressure.

Although variable, the material used for the infant seat liners of the invention typically has a taber stiffness of approximately twenty to fifty g-cm. An exemplary liner material also has an absorbency capacity of greater than five milliliters for each gram of core material included in the pad.

As shown in FIG. 5, a suitable infant seat liner is comprised of three layers including a face sheet 212, a core 214, and a backing sheet 216.

The face sheet is typically a non-woven material which may be imprinted with a design. The non-woven material is liquid permeable and allows spilled material to pass through it and into the absorbent core layer 214. Typical facing layers are of materials such as spun laced, resin bonded, spun bonded or carded thermoplastic containing or thermoplastic materials such as polyester and polypropylene.

The core layer is typically a combination of thermoplastic and other fibers such as chemical wood pulp and Pulpex ®. Pulpex is a material available from Hercules Corporation and described in U.S. Pat. No. 4,458,542. Other thermoplastic materials ay also be used. A typical mixture is comprised of 80% by weight pulp and 20% by weight Pulpex ®. However, mixtures of from 60–95% pulp and 5–40% thermoplastic materials are suitable. The core material 214 is applied in an amount of between 150 and 300 gm/m$^2$ as a typical example. In addition, during formation, the core and facing sheet are typically heated so that the core fibers become thermobonded together and also become thermobonded to the facing sheet. The compressed, bonded and sealed areas (i.e. bonds 204 in FIG. 1) are placed so that the material typically has a bulk of at least 1 cc/gm. The peripheral edge of the infant seat liner is typically bonded, such as indicated at 210 (FIG. 1). Also, bonds are formed to accommodate the perforations (i.e. at 96 in FIG. 2). Typically, these bonds are formed by heat embossing with bonds 204 being formed before the other bonds. Latex adhesive or other bonding approaches may be used whether or not the core, facing or backing sheets contain thermoplastic materials.

The backing sheet 212 may be of a liquid impermeable film which may be breathable. In one form, the backing 212 is fire resistant film which is adhesively bonded or otherwise secured to the core 214 at every point of contact with the core. An exemplary fire resistant film is GF19 film from Consolidated Thermoplastics of Arlington Heights, Ill. The composite infant car seat liner constructed with this film has a fire resistance of about 3.5 lineal inches to four lineal inches per minute when tested in accordance with Federal Motor Vehicles Safety Standard 302. Without the fire retardant film, or other mechanisms for achieving fire resistance such as fire retardant chemicals in the core or on the surface of the core, the liner has a fire resistance of from about five to eleven lineal inches per minute when tested in this manner. The film may be positioned after the core and facing sheet are bonded together and after the embossed field bond areas have been provided. Alternatively, the film may be of a type which is bonded to the core during the embossing step.

Following assembly, the infant seat liner is cut to shape, for example, by a die, water knife or laser. Perforations may also be formed in the liner, for example, by placing a screen or perforated template over the area to be perforated. The water knife is then passed over the template to form the perforations. Also, perforations can be formed by interrupting a water knife stream or laser as cuts are being made to form the perforations. Mechanical deflectors or an air stream may selectively deflect a water knife stream away from the article to interrupt the water knife and form the perforations. With edges of the infant seat liner being bonded as described, the edges are sealed with all three layers extending to and forming the edge. This strengthens the edge and minimizes the escapement of dust. However, the liners may be cut slightly outside of the densified peripheral regions to provide a soft edge. In addition, when the perforations are positioned in the densified or bonded areas of the infant seat liner, the perforations are typically formed at locations where the pad remains sealed by the bonds.

Having illustrated and described the principles of our invention with reference to several preferred embodiments, it will be apparent to those of ordinary skill in the art that the invention may be modified in arrangement and detail without departing from such principles. For example, other suitable materials for the infant seat liner may be used in place of those described. Also, the dimensions may be varied from the optimum dimensions described above. Therefore, we claim as our invention all such modifications as come within the scope of the following claims.

We claim:

1. A disposable infant seat liner for car seats of the type having a pair of shoulder straps and at least one leg strap comprising:
    a body of a disposable material having a longitudinal centerline and including an upper shoulder supporting section, a central section and a lower leg supporting section;
    means defining at least two shoulder strap receiving slotways, the shoulder strap receiving slotways being positioned at opposite sides of the centerline of the upper shoulder supporting section;
    means defining at least one leg strap receiving slotway in the lower leg supporting section; and
    the body having first and second side edges and in which the central section of the body is enlarged relative to the upper end portion of the body and relative to a lower end portion of the lower leg supporting section of the body, the first and second side edges converging from the central section to the lower leg supporting section to provide a narrowing transition between these sections of the infant seat liner, the liner including a first inwardly directed slit extending inwardly from the first side edge of the central body section and a second inwardly directed slit extending inwardly from the second side edge of the central section of the body opposite to the first side edge, whereby the slits permit portions of the central section of the body adjacent to these slits to overlap one another when the body is positioned in an infant seat.

2. An infant seat liner according to claim 1 which includes first and second transversely spaced waist strap receiving slotways each positioned between a respective slit and a respective shoulder strap receiving pathway.

3. An infant seat liner according to claim 1 in which the respective portions of the liner bounding the slits are generally of a lobe shape.

4. An infant seat liner according to claim 1 including means defining at least three flap defining leg strap receiving slotways spaced longitudinally apart in the lower leg supporting section.

5. An infant seat liner according to claim 4 including a first shoulder strap receiving pathway extending from the first side edge to a shoulder strap receiving slotway at a first side of the center line of the upper body and a second shoulder strap receiving pathway extending from the second side edge to a shoulder strap receiving slotway at the second side of the center line of the body.

6. A disposable infant seat liner for car seats of the type having a pair of shoulder straps and at least one leg strap comprising:
    a body of a disposable material having a longitudinal centerline and including an upper shoulder supporting section, a central section and a lower leg supporting section;
    means defining at least one leg strap receiving slotway in the lower leg supporting section;
    the body having first and second side edges and in which the central section of the body is enlarged relative to the upper shoulder supporting section and relative to a lower end portion of the lower leg supporting section of the body, the liner including a first inwardly directed slit extending inwardly from the first side edge of the central body section and a second inwardly directed slit extending inwardly from the second side edge of the central section of the body opposite to the first side edge, whereby the slits permit portions of the central section of the body adjacent to these slits to overlap one another when the body is positioned in an infant seat; and at least one shoulder strap receiving pathway at each side of the upper body, each shoulder strap receiving pathway including plural shoulder strap receiving portions spaced inwardly from the edge of the body and at least one shoulder strap receiving slotway portion extending from the side edge of the body to the shoulder strap receiving portion, whereby each of the shoulder strap receiving portions is accessible from a side edge of the body along either the first or second shoulder strap receiving slotway portions.

7. An infant seat liner according to claim 6 including means defining plural leg strap receiving slotways in the lower leg supporting section.

8. An infant seat liner according to claim 7 in which at least a portion of one of the group comprising the shoulder strap receiving slotways, first and second shoulder strap receiving pathways and leg strap receiving slotways is selectively openable to receive the shoulder straps and leg strap or straps of the infant seat liner.

9. A disposable infant seat liner for car seats of the type having a pair of shoulder straps and at least one leg strap comprising:

a body of a disposable material having a longitudinal centerline and including an upper shoulder supporting section, a central section and a lower leg supporting section;

means defining at least one leg strap receiving slotway in the lower leg supporting section;

the body having first and second side edges and in which the central section of the body is enlarged relative to the upper shoulder supporting section and relative to a lower end portion of the lower leg supporting section of the body, the liner including a first inwardly directed slit extending inwardly from the first side edge of the central body section and a second inwardly directed slit extending inwardly from the second side edge of the central section of the body opposite to the first side edge, whereby the slits permit portions of the central section of the body adjacent to these slits to overlap one another when the body is positioned in an infant seat;

at least one shoulder strap receiving pathway at each side of the upper body, each shoulder strap receiving pathway including plural shoulder strap receiving portions spaced inwardly from the edge of the body and at least one shoulder strap receiving slotway portion extending from the side edge of the body to the shoulder strap receiving portion, whereby each of the shoulder strap receiving portions is accessible from a side edge of the body along either the first or second shoulder strap receiving slotway portions;

means defining plural leg strap receiving slotways in the lower leg supporting section; and in which at least a portion of one of the group comprising the shoulder strap receiving slotways, first and second shoulder strap receiving pathways and the leg strap receiving slotways is perforated to facilitate selective opening thereof by a user of the infant seat liner.

10. A disposable infant seat liner for car seats of the type having a pair of shoulder straps and at least one leg strap comprising:

a body of a disposable material having a longitudinal centerline and including an upper shoulder supporting section, a central section and a lower leg supporting section;

means defining at least one leg strap receiving slotway in the lower leg supporting section;

the body having first and second side edges and in which the central section of the body is enlarged relative to the upper shoulder supporting section and relative to a lower end portion of the lower leg supporting section of the body, the liner including a first inwardly directed slit extending inwardly from the first side edge of the central body section and a second inwardly directed slit extending inwardly from the second side edge of the central section of the body opposite to the first side edge, whereby the slits permit portions of the central section of the body adjacent to these slits to overlap one another when the body is positioned in an infant seat;

at least one shoulder strap receiving pathway at each side of the upper body, each shoulder strap receiving pathway including plural shoulder strap receiving portions spaced inwardly from the edge of the body and at lest one shoulder strap receiving slotway portion extending from the side edge of the body to the shoulder strap receiving portion, whereby each of the shoulder strap receiving portions is accessible from a side edge of the body along either the first or second shoulder strap receiving slotway portions; and there being only one such shoulder strap receiving slotway portion extending to the edge of the body at each side of the body and plural shoulder strap receiving portions associated with each shoulder strap receiving slotway, the shoulder strap receiving portions being spaced inwardly from the edge of the body and being accessible from the associated slotway.

11. An infant seat liner according to claim 10 in which each shoulder strap receiving location comprises a user openable flap bounded by a perforated flap defining boundary.

12. A disposable infant seat liner for car seats of the type having a pair of shoulder straps and at least one leg strap comprising:

a body of a disposable material having a longitudinal centerline and including an upper shoulder supporting section, a central section and a lower leg supporting section;

means defining at least one leg strap receiving slotway in the lower leg supporting section;

the body having first and second side edges and in which the central section of the body is enlarged relative to the upper shoulder supporting section and relative to a lower end portion of the lower leg supporting section of the body, the liner including a first inwardly directed slit extending inwardly from the first side edge of the central body section and a second inwardly directed slit extending inwardly from the second side edge of the central section of the body opposite to the first side edge, whereby the slits permit portions of the central section of the body adjacent to these slits to overlap one another when the body is positioned in an infant seat; and there being only one such shoulder strap receiving slotway portion extending to the edge of the body at each side of the body, each shoulder strap receiving pathway extending inwardly from the edge along a first line for a first distance and then turning to extend backwardly toward the edge along a second line spaced from the first line, one of the shoulder strap receiving portions comprising a portion of the slotway along the first line and another of the shoulder strap receiving portions comprising a portion of the slotway along the second line.

13. An infant seat liner according to claim 12 including at least one user openable perforated leg strap receiving slotway extending through a central portion of the lower section of the body.

14. An infant seat liner according to claim 13 including plural user openable perforated spaced apart leg strap receiving slotways.

15. An infant seat liner according to claim 14 in which each leg strap receiving slotway is generally U-shaped.

16. A disposable infant seat liner for car seats having a pair of shoulder straps and at least one leg strap comprising:
 a body of a disposable material having a longitudinal centerline and an upper shoulder supporting section, a central section and a lower leg supporting section;
 the upper section having a first upper and a second lower shoulder strap receiving location at each side of the longitudinal centerline of the body;
 the lower section having first upper, second middle and third lower transversely extending leg strap receiving locations;
 the distances along the longitudinal centerline of the body from the first upper shoulder strap receiving location to the first upper, second middle and third lower leg strap receiving locations being respectively about thirteen and three-fourths inches, fifteen and one-fourth inches, and seventeen and seven-eighths inches; and
 the distances along the longitudinal centerline of the body from the second lower shoulder strap receiving location to the first upper, second middle and third lower leg strap receiving locations being respectively about twelve and one-fourth inches, thirteen and three-fourths inches, and sixteen and three-eights inches.

17. An infant seat liner according to claim 16 having a first side slotway directed inwardly from a first side edge of the central section, a second side slotway directed inwardly from a second side edge of the central section, first and second arcuate waist strap receiving slotways disposed in the central section on opposite sides of the longitudinal centerline of the body and above the side slotways.

18. A disposable infant seat liner for car seats of the type having a pair of shoulder straps and at least one leg strap comprising:
 a body of a disposable material including an upper shoulder supporting section, a central section and a lower leg supporting section;
 one shoulder strap receiving pathway at each side of the body at an upper end portion thereof, each shoulder strap receiving pathway extending inwardly from the edge of the body along a first line for a first distance and then turning to extend partially backwardly toward the edge along a second line spaced from the first line;
 plural spaced apart user openable perforated leg strap receiving slotways extending through a central portion of the lower leg supporting section of the body, each leg strap receiving slotway being generally U-shaped.

19. An infant seat liner according to claim 18 in which at least a portion of the shoulder strap receiving pathways are perforated, the perforated shoulder strap receiving pathway portions being retained in a closed position so as to preserve the integrity of the body until the perforations are severed by the user to thereby open the shoulder strap receiving pathways for positioning of the shoulder straps.

20. An infant seat liner according to claim 18 in which the central section of the body is enlarged relative to a lower end portion of the lower leg supporting section of the body, the liner including first and second side edges and a first inwardly directed slit extending inwardly from the second side edge at the central body section and a second inwardly directed slit extending inwardly from a side edge of the central section of the body opposite to the one side edge, whereby the slits permit portions of the body adjacent to these slits to overlap one another when the body is positioned in a car seat.

21. An infant seat liner according to claim 20 which includes a first and second transversely spaced perforated waist strap receiving arcuate slotways each positioned between a respective slit and a respective shoulder strap receiving pathway.

22. An infant seat liner according to claim 21 including means for detachably securing the body to the car seat.

23. A disposable infant seat liner for car seats of the type having a pair of shoulder straps and at least one leg strap comprising:
 a body of a disposable material having a longitudinal centerline and including an upper shoulder supporting section, a central section and a lower leg supporting section;
 means defining at least one shoulder strap receiving slotway at each side of the centerline of the upper shoulder supporting section;
 means defining at lest two spaced apart U-shaped leg strap receiving slotways in the lower leg supporting section, the U-shaped leg strap receiving slotways permitting shifting of the liner upwardly and downwardly to provide a better fit of the liner to the shoulder straps and leg strap.

24. A disposable infant seat liner for car seats of the type having a pair of shoulder straps and at least one leg strap comprising:
 a body of a disposable material having a longitudinal centerline and including an upper shoulder supporting section, a central section and a lower leg supporting section;
 means defining at lest one shoulder strap receiving slotway at each side of the centerline of the upper shoulder supporting section;
 means defining at least two spaced apart U-shaped leg strap receiving slotways in the lower leg supporting section; and
 the leg strap receiving slotways being user openable.

25. A disposable infant seat liner for car seats of the type having a pair of shoulder straps and at least one leg strap comprising:
 a body of a disposable material having a longitudinal centerline and including an upper shoulder supporting section, a central section and a lower legs supporting section;

means defining at least one shoulder strap receiving slotway at each side of the centerline of the upper shoulder supporting section;

means defining at least two spaced apart U-shaped leg strap receiving slotways in the lower leg supporting section; and there being three such leg strap receiving slotways.

26. An infant seat liner according to claim 25 in which each of the leg strap receiving slotways is perforated so as to be retained in a closed position until opened by a user.

* * * * *

UNITED STATES PATENT AND TRADEMARK OFFICE
CERTIFICATE OF CORRECTION

PATENT NO. : 4,883,701

DATED : November 28, 1989

INVENTOR(S) : Janice J. Rankin and Marilyn M. Pearson

It is certified that error appears in the above-identified patent and that said Letters Patent is hereby corrected as shown below:

```
Column 4, line 22, "font" should be --front--.

Column 6, line 22, "qenerally" should be --generally--.

Column 10, line 59, "ay" should be --may--.

Column 16, line 42, "lest" should be --least--.
```

Signed and Sealed this

Nineteenth Day of June, 1990

*Attest:*

HARRY F. MANBECK, JR.

*Attesting Officer*  *Commissioner of Patents and Trademarks*